United States Patent
Dean et al.

(10) Patent No.: US 8,223,426 B2
(45) Date of Patent: Jul. 17, 2012

(54) METHOD AND APPARATUS FOR PROVIDING A DECORATIVE SURFACE

(75) Inventors: Kenneth A. Dean, Phoenix, AZ (US); Michael R. Johnson, Tempe, AZ (US); Jason C. Heikenfeld, Cincinnati, OH (US)

(73) Assignee: Motorola Mobility, Inc., Libertyville, IL (US)

( * ) Notice: Subject to any disclaimer, the term of this patent is extended or adjusted under 35 U.S.C. 154(b) by 663 days.

(21) Appl. No.: 12/339,914

(22) Filed: Dec. 19, 2008

(65) Prior Publication Data

US 2010/0157413 A1 Jun. 24, 2010

(51) Int. Cl.
G02F 1/29 (2006.01)

(52) U.S. Cl. .................................................... 359/316

(58) Field of Classification Search .......... 359/315–320, 359/245, 253, 254, 291, 292
See application file for complete search history.

(56) References Cited

U.S. PATENT DOCUMENTS

| | | | |
|---|---|---|---|
| 5,233,459 A | 8/1993 | Bozler et al. | |
| 7,656,588 B2 * | 2/2010 | Bae et al. | 359/665 |
| 7,746,540 B2 * | 6/2010 | Lo et al. | 359/290 |
| 7,791,814 B2 * | 9/2010 | Liogier D'ardhuy et al. | 359/665 |

FOREIGN PATENT DOCUMENTS

| | | | |
|---|---|---|---|
| JP | 2003-98538 | * | 4/2003 |
| JP | 2003098538 A | | 4/2003 |
| JP | 2004-163482 | * | 6/2004 |
| JP | 2004163482 A | | 6/2004 |
| JP | 2006065248 A | | 3/2006 |
| KR | 100704651 B1 | | 4/2007 |
| KR | 100773439 B1 | | 11/2007 |
| WO | WO 2005029449 A1 | | 3/2005 |
| WO | WO 2006027746 A1 | | 3/2006 |
| WO | WO 2006075279 A1 | | 7/2006 |

OTHER PUBLICATIONS

Korean Intellectual Property Office, "Notification of Transmittal of the International Search Report and the Written Opinion of the International Searching Authority, or the Declaration," dated Jul. 21, 2010, for PCT Application No. PCT/US2009/067612 (9 pages).

* cited by examiner

Primary Examiner — Ricky Mack
Assistant Examiner — Tuyen Tra
(74) Attorney, Agent, or Firm — Gary J. Cunningham

(57) ABSTRACT

A decorative housing (11) for a mobile device (10) includes a first faceted cell (12) having a first angled electro-optic element (14) disposed therein. A second faceted cell (16) is adjacent the first cell (12) and has second angled electro-optic elements (18). A liquid (20) is in fluid communication with each faceted cell (12, 16) and moveable to a first position (22) in response to a first electric field (24) applied to one of the first and second electro-optic elements (14, 18) and moveable to a second position (26) in response to a second electric field (28) applied to the other of the first and second electro-optic elements (14, 18). An electronic modulator (30) is coupled to the first electro-optic element (14) and the second electro-optic element (18) to electronically modulate between the first electric field (24) and the second electric field (28).

19 Claims, 9 Drawing Sheets

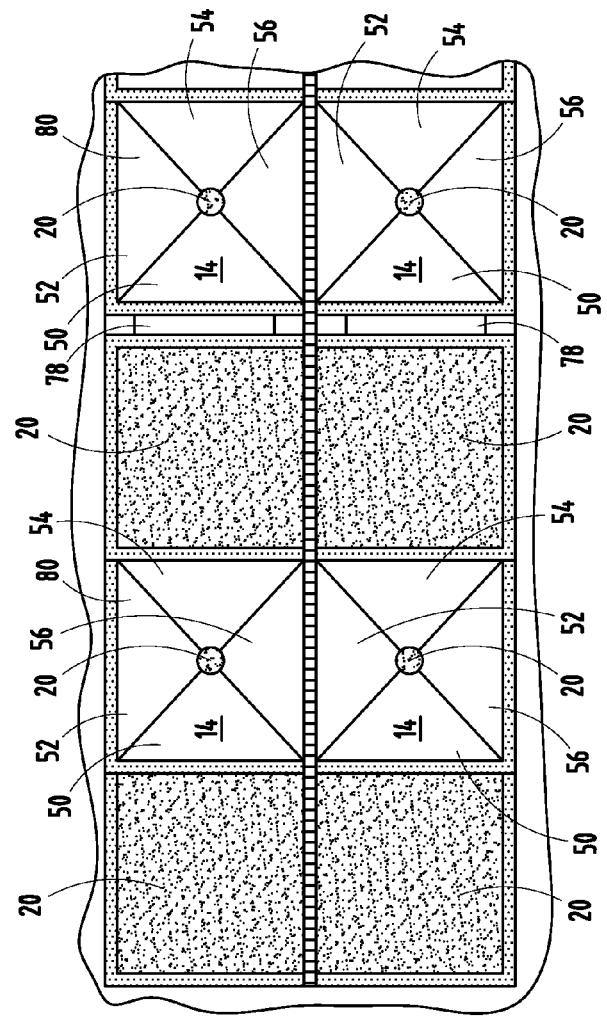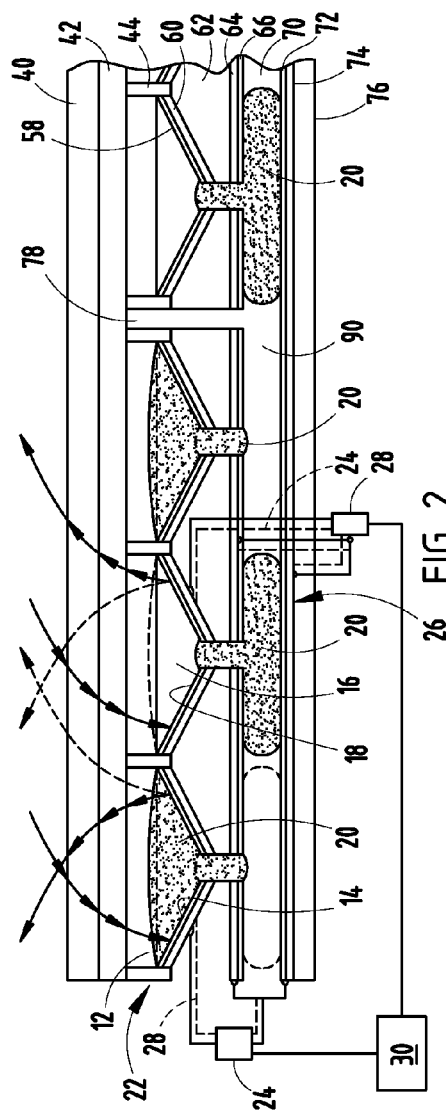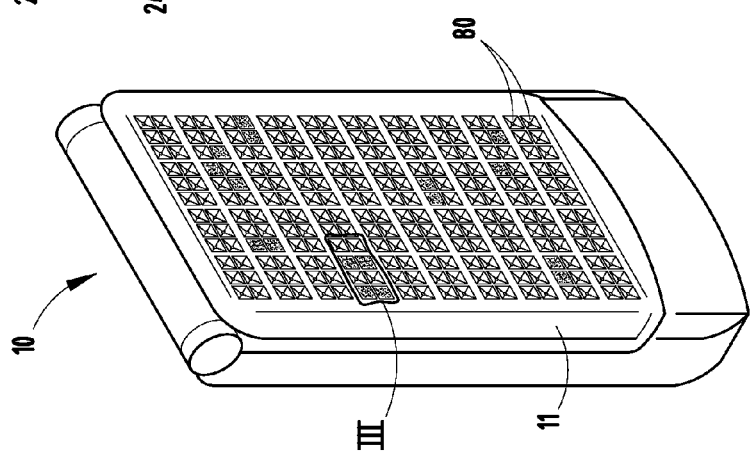

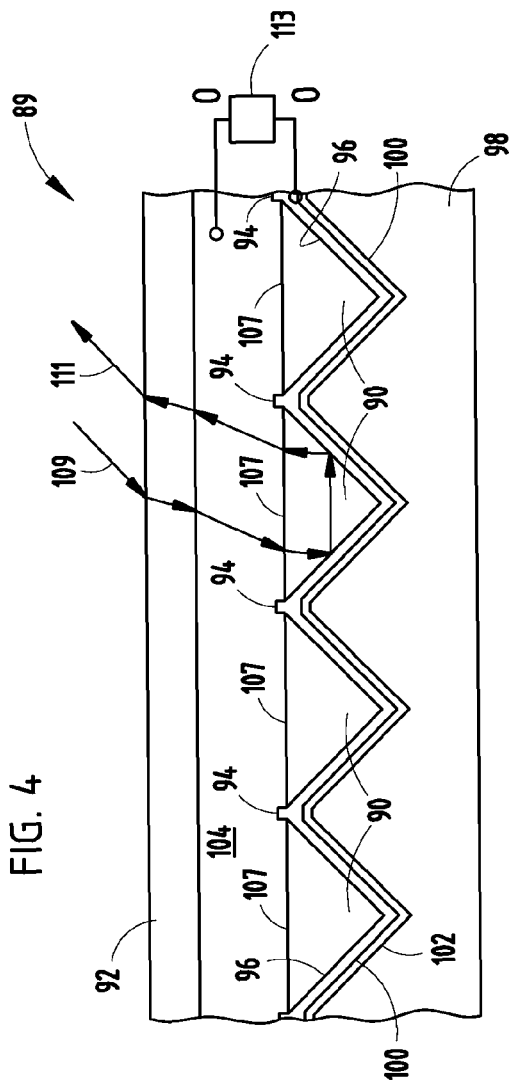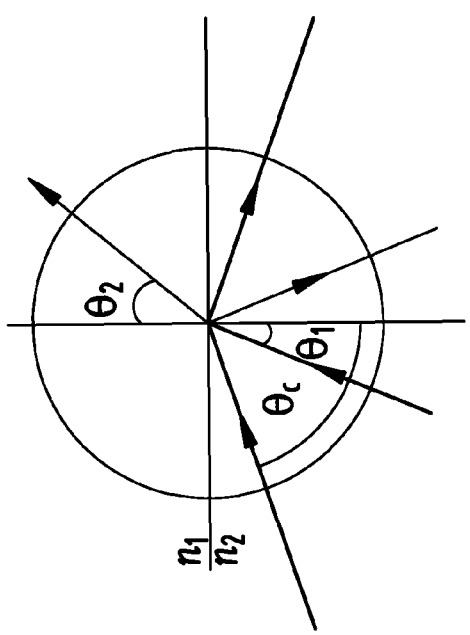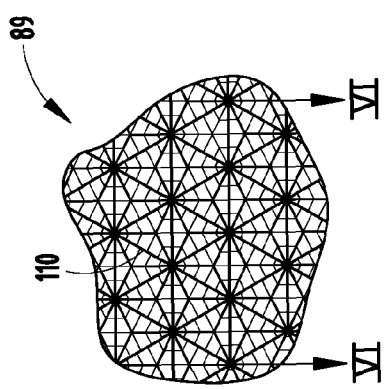

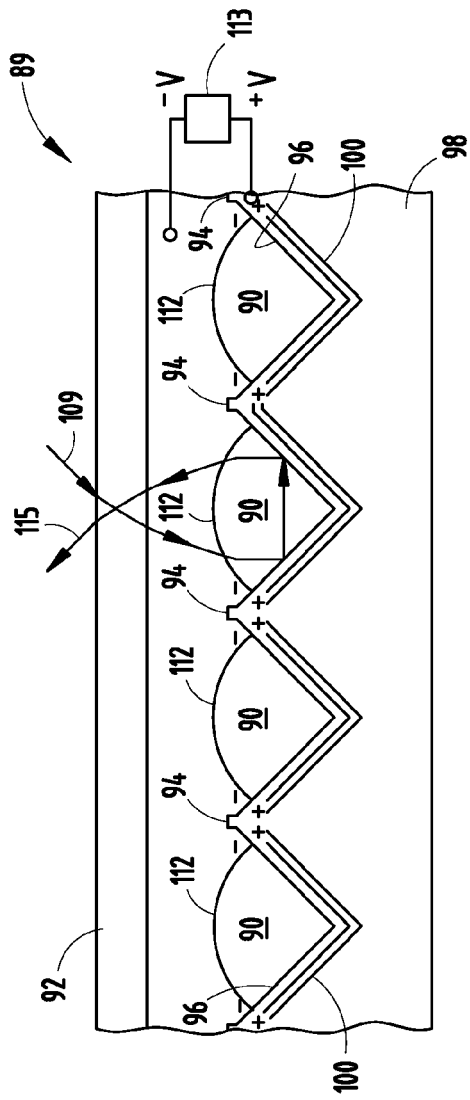
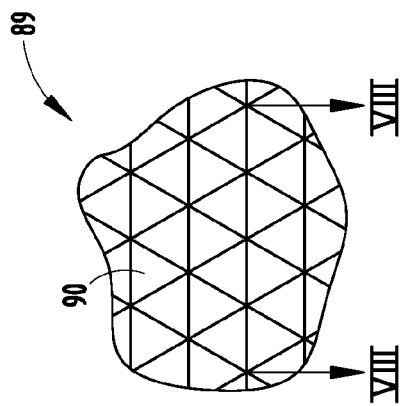
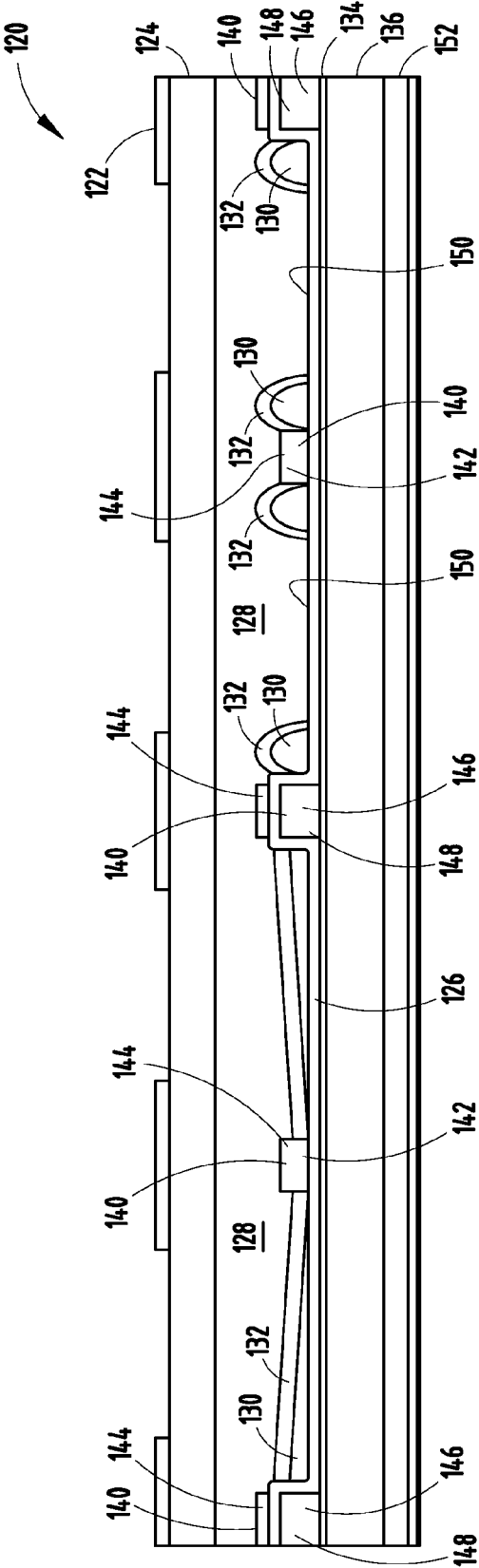
FIG. 8
FIG. 7
FIG. 9

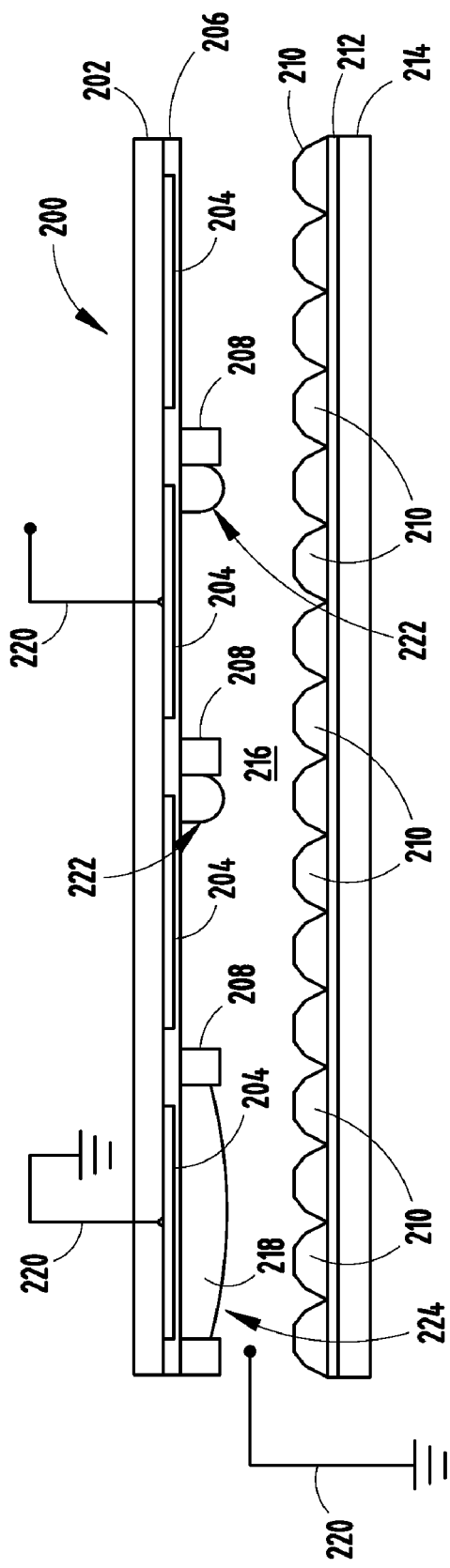
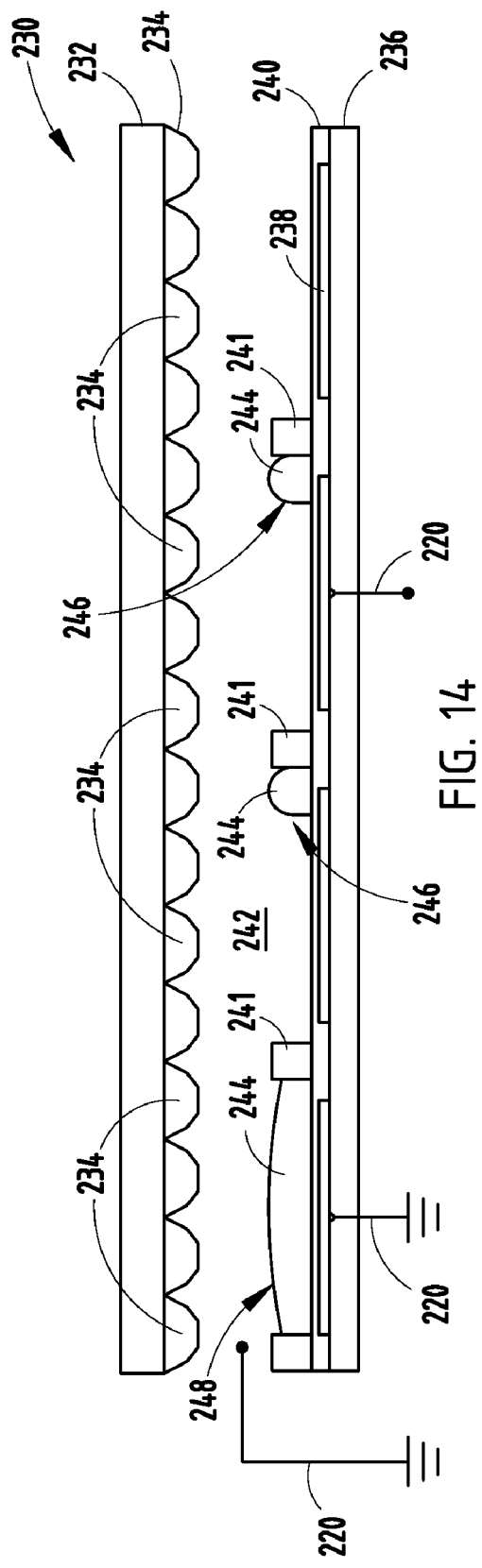

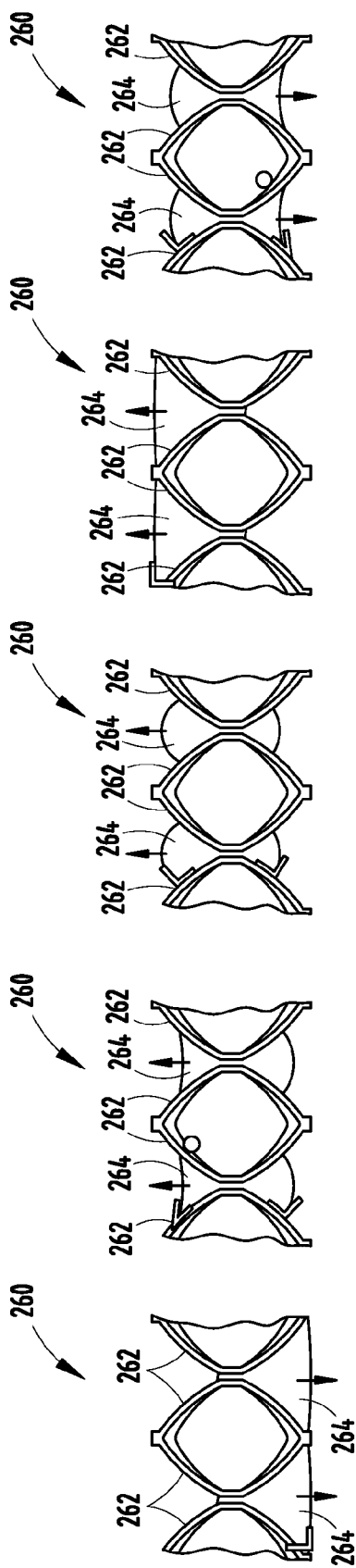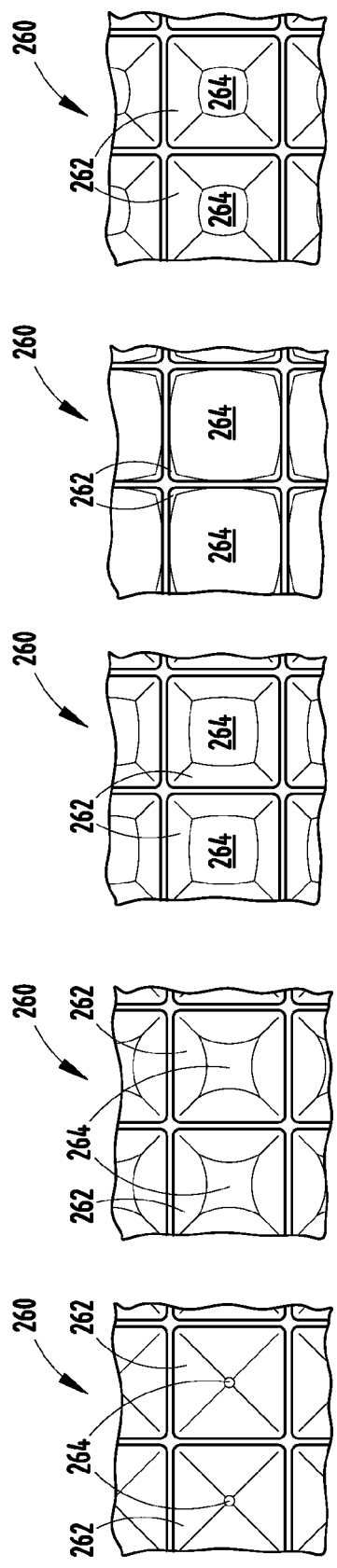

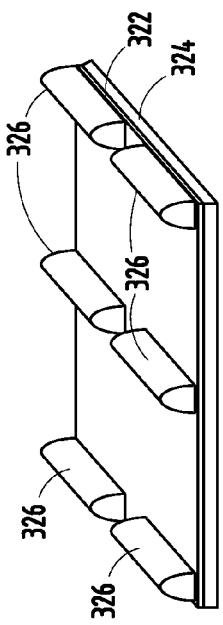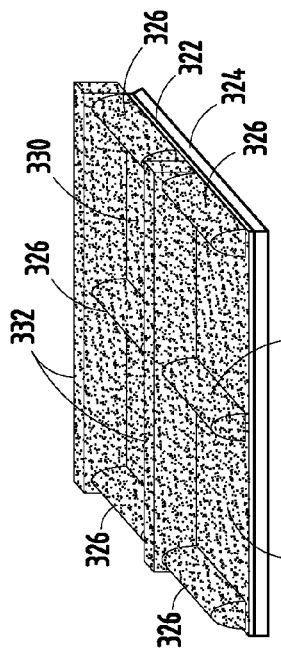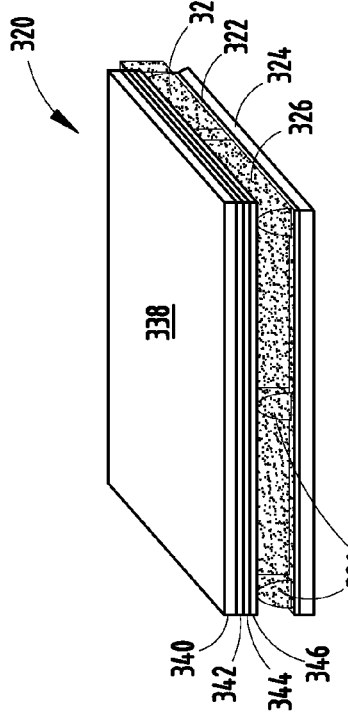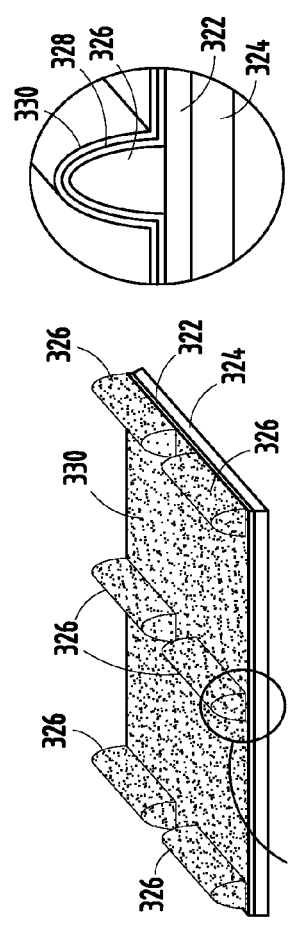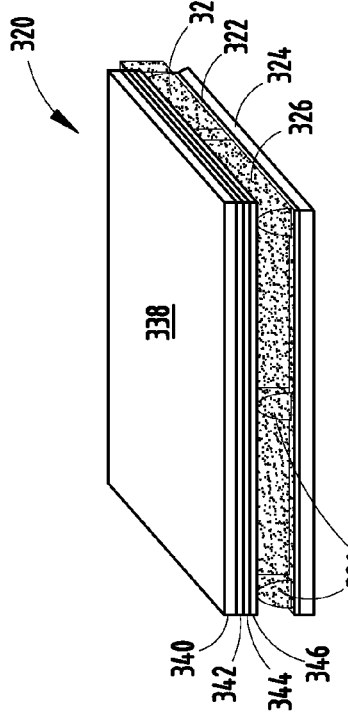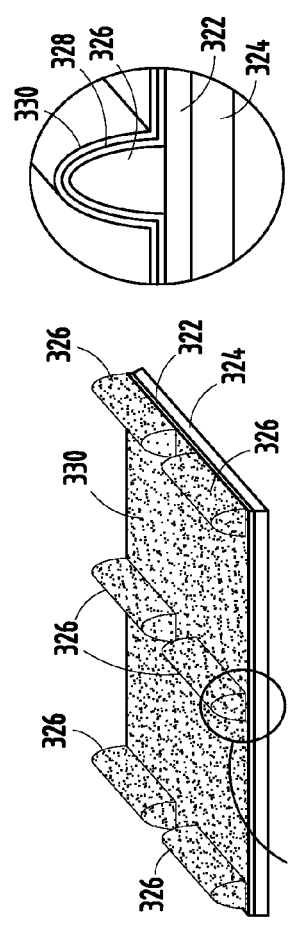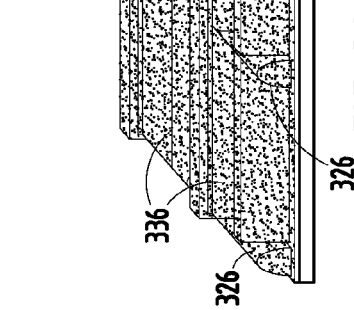

METHOD AND APPARATUS FOR PROVIDING A DECORATIVE SURFACE

FIELD OF THE INVENTION

The present invention relates generally to a decorative surface and more particularly to creating a decorative surface on a mobile device.

BACKGROUND

The market for electronic devices, especially personal portable electronic devices such as cell telephones, personal digital assistants (PDAs), digital cameras, and music playback devices (MP3), is very competitive. The addition of technologically advanced and stylistic designs would be beneficial.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 1 is a front perspective view of a phone housing surface with faceted structures;

FIG. 2 is a cross-sectional elevational view of the casing of FIG. 1, wherein predetermined faceted structures are reflecting light;

FIG. 3 is an elongated front elevational view of area III of the casing of FIG. 1;

FIG. 4 illustrates total internal reflection angles based on Snell's law;

FIG. 5 is a top elevational view of one embodiment of the geometrical design of faceted structures on the casing of a mobile device when no electrical charge is applied;

FIG. 6 is a cross-sectional side elevational view of the faceted structures of FIG. 5 when no electrical charge is applied;

FIG. 7 is a top elevational view of the faceted structures of FIG. 5, illustrating the curvature of fluid in the casing of the mobile device when an electrical charge is applied;

FIG. 8 is a cross-sectional side elevational view of the faceted structures of FIG. 7, illustrating light angles when an electrical charge is applied to the mobile device housing;

FIG. 9 is a cross-sectional view of another embodiment of a mobile device housing having electrically charged faceted structures adjacent non-electrically charged faceted structures;

FIG. 13 is a cross-sectional side elevational view of another embodiment of a mobile device housing with faceted structures adjacent the inside wall of the mobile device;

FIG. 14 is a cross-sectional side elevational view of another embodiment of a mobile device housing with the faceted structures adjacent to the external wall of the mobile device housing;

FIG. 15A is a cross-sectional side elevational view of yet another embodiment of a mobile device housing wherein a charge is applied to an underside of the faceted structures;

FIG. 15B is a top elevational view of the faceted structures of FIG. 15A;

FIG. 16A is a cross-sectional side elevational view of the faceted structures of 15A with charge applied to the top portion of the faceted structures;

FIG. 16B is a top elevational view of the faceted structures of FIG. 16A;

FIG. 17A is a cross-sectional side elevational view of the faceted structures of FIG. 15A with non-polar fluid moving to a position above the faceted structures;

FIG. 17B is a top elevational view of the faceted structures of FIG. 17A;

FIG. 18A is a cross-sectional side elevational view of the faceted structures with a fluid completely ascended above the faceted structures;

FIG. 18B is a top elevational view of the faceted structures of FIG. 18A;

FIG. 19A is a cross-sectional side elevational view of faceted structures with a charge applied to a lower portion of the faceted structures;

FIG. 19B is a top elevational view of faceted structures of FIG. 19A;

FIG. 22 is a top perspective view of a conductor and substrate;

FIG. 23 is a top perspective view of the conductor and substrate of FIG. 22 with ribs;

FIG. 24 is a substrate and conductor with ribs overcoated with an insulator and hydrophobic layer;

FIG. 24A is an enlarged view of the area XXIV of FIG. 24;

FIG. 25 is a top perspective view of FIG. 24 with hydrophilic walls to create cells;

FIG. 26 is a top perspective view of FIG. 25 with polar and non-polar fluid added to the cells; and FIG. 27 is the partial completed portion of a mobile device housing of the present invention.

Figure 10C:
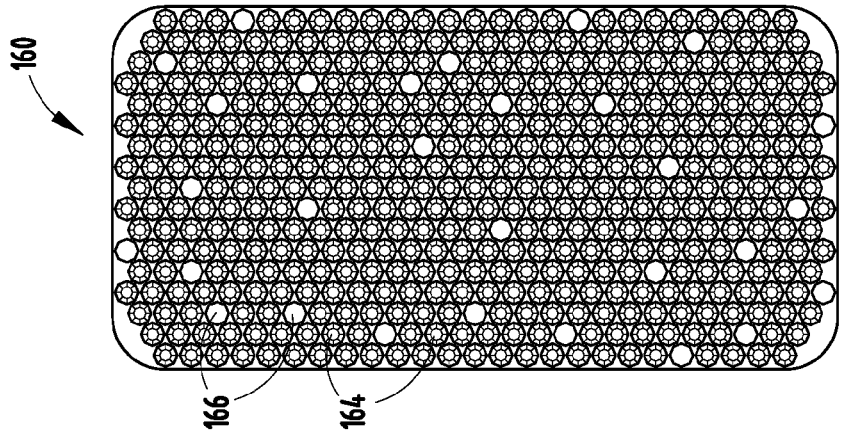
FIG. 10C is a rear elevational view of the casing of FIG. 10A with second select faceted structures receiving an electrical charge.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to electrowetting and electro-optic surfaces. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of electrowetting and electro-optic surfaces described herein. The non-processor circuits may include, but are not limited to, a radio receiver, a radio transmitter, signal drivers, clock circuits, power source circuits, and user input devices. As such, these functions may be interpreted as steps of a method to perform electrowetting and construct electro-optic surfaces. Alternatively, some or all functions could be implemented by a state machine that has no stored program instructions, or in one or more application specific integrated circuits (ASICs), in which each function or some combinations of various functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Referring to FIGS. 1-3, the reference numeral 10 generally designates a mobile device having decorative housing 11. A first faceted cell 12 has a first angled electro-optic element 14 disposed therein. A second faceted cell 16 is adjacent the first faceted cell 12 and has a second angled electro-optic element 18. A liquid 20 is in fluid communication with each faceted cell 12, 16 and is moveable to a first position 22 in response to a first electric field 24 applied to one of the first and second electro-optic elements 14, 18 and moveable to a second position 26 in response to a second electric field 28 applied to the other of the first and second electro-optic elements 14, 18. An electronic modulator 30 coupled to the first electro-optic element 14 and the second electro-optic element 18 to electronically modulate between the first electric field 24 and the second electric field 28.

Referring again to FIGS. 1-3, the illustrated embodiment depicts a cross-section of the housing 11 having a transparent top plate 40, a rib 42, and a cell wall 44. A second fluid is present between the cell walls 44 and the ribs 42. First, second, third and fourth lower walls 50, 52, 54, 56 include an upper hydrophobic dielectric material 58 overlying an angled reflective metal electrode 60. An inner matrix 62 supports the angled reflective metal electrode 60 and separates the angled reflective metal electrode 60 from an intermediate electrode 64 overlying an intermediate hydrophobic dielectric 66. A lower cavity 70 having the second fluid disposed therein separates the intermediate hydrophobic dielectric 66 from a lower hydrophobic dielectric 72. The lower hydrophobic dielectric 72 covers a lower electrode 74 disposed on a supporting substrate 76. Fluid conduits 78 are connected to the lower cavity 90 and are spaced along the surface of the housing 11. The fluid conduits 78 terminate at the ribs 42. In one embodiment, the first fluid is an oil combined with an oil-soluble dye, and the second fluid is a polar fluid such as water or mixtures including water. Application of electric field between the polar fluid and the metal electrode 60 cause polar fluid to be attracted to the hydrophobic surface 58, thereby moving the oil and dye mixture to the bottom channel, and revealing the reflective surfaces of the metal electrode 60. In another embodiment (not shown), the first fluid is a polar liquid such as water, loaded with dispersed pigments, and the second liquid is a non-polar fluid such as oil, air, or an inert gas.

Referring again to FIGS. 2 and 3, the decorative housing 11 (FIG. 1) includes a surface that emulates a multitude of jewels, rhinestones, or gemstones 80. When the first electric field 24 is applied to one of the first electro-optic elements 14, the jewels 80 appear to be non-reflective. When the second electric field 28 is applied to the first electro-optic element 14, the first faceted cell 12 has the appearance of a jewel and reflects light or sparkles. Similarly, when the first electric field 24 is applied to the second electro-optic elements 18 of the second faceted cell 16, the jewels 80 appear to be non-reflective. When the second electric field 28 is applied to the second electro-optic elements 18, the jewels 80 appear to reflect light or sparkle. This occurrence can happen over several seconds or very rapidly over just a few milliseconds.

Referring now to FIG. 4, faceted crystalline gemstones, best exemplified by brilliant-cut diamonds, owe their visual appeal primarily to total internal reflection. Consider two optical media $M_1$ and $M_2$ of refractive indices (RI) $n_1$ and $n_2$, respectively, with $n_1 < n_2$. In general, light incident from medium $M_1$ onto medium $M_2$ undergoes both reflection and refraction at the $M_1$-$M_2$ interface. Because $n_1 < n_2$, the light is refracted away from normal (conversely, if $n_1 > n_2$ then light would be refracted toward normal).

The angle of reflection equals the angle of incidence. The angle of refraction is related to the angle of incidence by Snell's law:

$$n_1 \cdot \sin(\theta_1) = n_2 \cdot \sin(\theta_2)$$

However, as the angle of incidence is increased the angle of refraction increases until, a critical angle, $\theta_c$, is reached, at which $\theta_2 = 90°$ and Snell's law becomes $$n_1 \cdot \sin(\theta_c) = n_2, \text{ or } \theta_c = \arcsin(n_2/n_1).$$

At $\theta_c$ and beyond, the light is only reflected; this condition is termed "total internal reflection" (FIG. 4).

There exists an inverse relationship between the solid angle around the normal for which refraction occurs and the magnitude of RI mismatch. For water ($n_1 = 1.33$) and air ($n_2 = 1.0003$), $\theta_c = 48.73°$. In the case of diamond ($n_1 = 2.417$) in air, $\theta_c = 24.45°$. Due to diamond's relatively high RI and the fact that it is typically viewed in a low RI medium, namely air, the critical angle for this system is the smallest typically encountered in the visible spectrum. As a result, light has a relatively long optical path in the diamond medium and undergoes multiple reflections before being refracted back into air. The multiple reflections, sending the incoming light back in different directions, is the origin of the diamond's "sparkle." Once again, a diamond-like sparkle effect is achievable with material systems of smaller index mismatch but the solid angle over which total internal reflection will not occur is larger.

It should be noted that a similar effect could be achieved by providing, in place of the faceted diamond surface, either a periodically and/or regularly faceted highly reflective surface or, a surface of highly reflective facets with individual facets having orientations which are randomly distributed. It is also conceivable to use diffractive elements, either transmissive or reflective, to achieve such an effect. For example, a distribution of reflection diffraction grating domains of random orientations disposed on the "bling" surface would not only reflect the light in a random manner but would also exhibit very pronounced dispersion of the reflected light (dispersion also occurs in refracting systems), reflecting different wavelengths (different colors) of light in different angles, providing an additional "bling" effect.

The property of a diamond, often referred to as "fire," is attributable to the wavelength dispersion of light as it traverses the material such that different wavelengths are refracted through different angles. Almost all materials have this property but diamond possesses an especially large spread of the visible wavelengths. This large spread manifests as a play of colors when light passes through the diamond and is then detected by the human eye. This property can be emulated in a "bling" application by suitable use of a highly optically dispersive material.

As illustrated in the embodiment of FIG. 5, no charge is acting on the polar fluid 104, such as water, leaving the non-polar liquid 90, such as oil covering a reflective conductor 100. In the illustrated embodiment of FIGS. 5-8, a transparent top plate 92 is positioned a predetermined distance over a polymer grid 94 and hydrophobic dielectric 96. A substrate layer 98 supports the hydrophobic dielectric 96 as well as a conductor 100 disposed between the substrate layer 98 and the hydrophobic dielectric 96. The substrate 98 has a top face 102 that is angled such that the hydrophobic dielectric 96 and conductor 100 are angled as well. The non-polar liquid 90 and a polar liquid 104 are placed between the transparent top plate 92 and the hydrophobic dielectric 96.

Referring now to FIGS. 7 and 8, a sparkling surface is shown on the housing portion 89 when the electric field is in the "off" or zero power state and the non-polar fluid has a relatively parallel and planar orientation 107 relative to the top plate (FIGS. 5 and 6). In the off or zero power status, incoming light 109 is reflected as outgoing light 111 (FIG. 6) back generally at the same angle from the housing 89 (FIG. 6). The sparkling features can be activated or removed by a controlled electronic signal. The sparkling is generated by a retro-reflector geometrical design 110 (FIG. 5) embossed or otherwise formed into the housing 89. Collections of retro-reflectors 110 may have different orientations, that is to say, the geometrical shapes may be different providing a varied appearance across the housing 89. The angle of the reflective hydrophobic dielectric 96 on the substrate layer 98 gives the appearance of reflective gemstones. Upon application of voltage by a power source 113 to the conductor 100, which is, in this case a reflective metal electrode, the curvature of the non-polar fluid in the cavity changes from a relatively planar orientation to a series of curved or arced formations 112 (FIG. 8). Incoming light 109 is reflected back as outgoing light 115 at a different angle than the angle at which incoming light 109 originally entered the housing portion 89. Accordingly, acting as a lens, the oil 90 destroys reflectability of the reflective hydrophobic dielectric 96, thereby reducing or eliminating the sparkling of the housing portion 89 (FIG. 8).

Referring now to FIG. 9, the illustrated embodiment depicts a cross section of another mobile device housing 120. A top layer 122 is secured to and disposed over a transparent top plate 124. Located between the transparent top plate 124 and a hydrophobic dielectric 126 is a polar fluid 128 and a non-polar fluid 130 having reflective flakes 132. The reflective flakes may be Janus particles, which have surfaces with different polar and non-polar preferences. Below the hydrophobic dielectric 126 is a transparent conductor 134 supported over a transparent substrate 136. Dispersed at predetermined positions along the cross section of the casing are a plurality of cellular walls 140 that have varying heights. More specifically, short cellular walls 142 include a cellular block 144 that is connected directly to the hydrophobic dielectric 126. Taller cellular walls 146 include a polymer wall 148 that extends below the hydrophobic dielectric 126 and supports the cellular block 144 thereon. The hydrophobic dielectric 126 extends along the transparent conductor 134 and over the polymer walls 148.

Referring again to FIG. 9, it is contemplated that the short cellular walls 142 will be disposed between two tall cellular walls 146. This construction causes the non-polar fluid 130 and reflective flakes 132 to extend between the short cellular wall 142 and the tall cellular wall 146 and as a result of surface tension, rise higher on the tall cellular wall 146 than on the short cellular wall 142. Accordingly, the non-polar fluid 130 and reflective flakes 132 are angled relative to the hydrophobic dielectric 126 and transparent conductor 134 as well as the transparent top plate 124. The angle of the non-polar fluid 130 and reflective flakes 132 gives the appearance of a plurality of gem stones inside the housing 120. When voltage is applied to the transparent conductor 134, the non-polar fluid 130 and reflective flakes 132 become attracted to the interface between the cellular walls 142, 146 and the hydrophobic dielectric 126. Accordingly, the non-polar fluid 130 and reflective flakes 132 "bunch up" to the cellular walls 142, 146 thereby leaving a vacated space 150. The space 150 vacated by the reflective flakes 132 is now transparent, revealing the frame element 152 directly beneath the substrate 136. The frame element 152 may be colored or transparent. When the device is driven into the state where the top plate is transparent, the space 150 is transparent, the substrate 136 is transparent, and the frame element 152 is transparent, it is possible to reveal objects and features underneath the decorative surface. These objects include graphics, buttons, and displays, such as clocks, indicators, light emitting diodes, and video displays. In the example of a cell phone, a liquid crystal display, present beneath the decorative surface can be revealed when the decorative surface is in a transparent state, and the backlight can be activated to project light through the decorative surface. Transparency of the housing 120 is maintained by continual application of voltage to the transparent conductor 134 and polar fluid 128. However, the leakage current is tremendously small, and transparency can be maintained for minutes after the voltage source (not shown) is disconnected. In the illustrated structure, voltage levels are applied once to set the desired transparency, and the voltage is reapplied at predetermined time intervals to refresh the charge thereby maintaining the desired transparency.

Figure 10B:
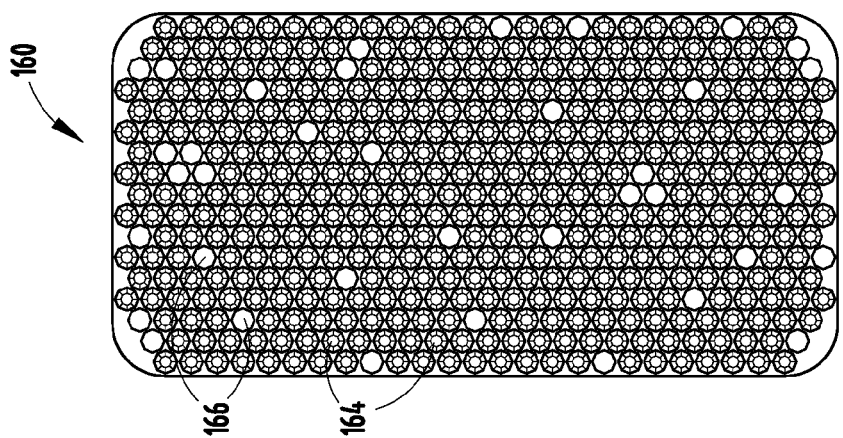
FIG. 10B is a rear elevational view of the casing of FIG. 10A with first select faceted structures receiving an electrical charge.
Figure 10A:
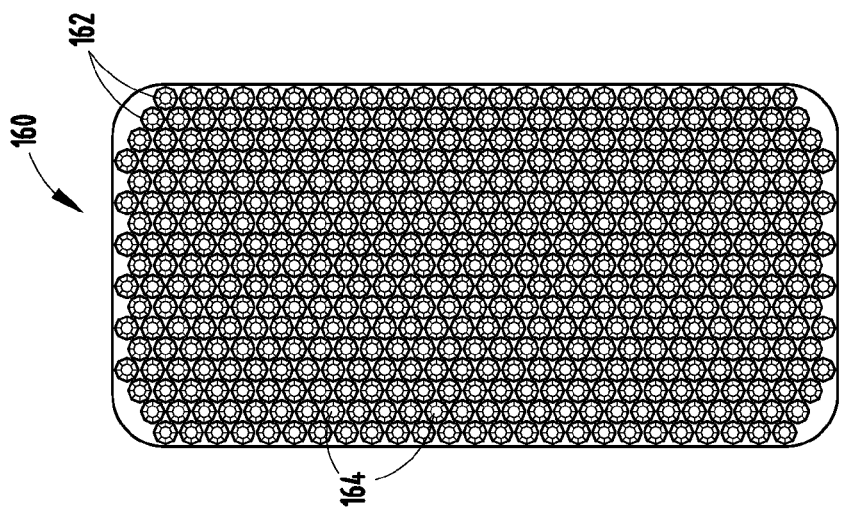
FIG. 10A is a rear elevational view of another embodiment of a mobile device with no charge applied to any faceted structures.

Referring now to FIGS. 10A-10C, another embodiment of a mobile device housing 160 is shown. The surface of the decorative housing 160 can take a variety of shapes and forms. The embodiment shown in FIG. 10A-10C illustrates multiple inverted polygonally-shaped facets 162 adjacent one another to give the appearance of a plurality of diamonds or other gemstones 164. It is contemplated that any size facet 162 with any number of sides and shapes can be used. As shown in FIGS. 10a-10c, a charge may be applied to select transparent conductors in the housing 160 such that particular gemstones 164 appear present from outside of the housing 160, while other gemstones 166 do not. Alternatively, the facets 162 appear to twinkle, such that the transparent conductors provide an alternating voltage governed by a modulator. When the modulator causes the voltage to be applied to select transparent conductors rapidly, the housing 160 has the outward appearance that the phone 10 is twinkling.

Figure 12:
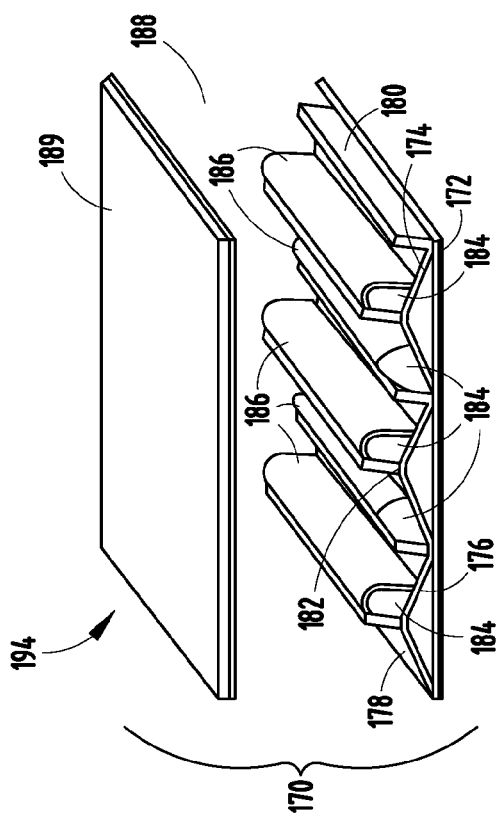
FIG. 12 is a top perspective view of another embodiment of a faceted structure of a mobile device with an electrical charge applied to the faceted structure.
Figure 11:
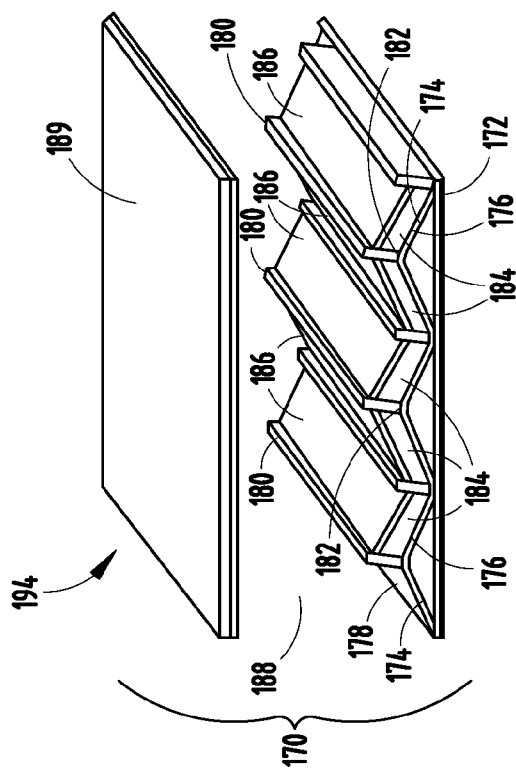
FIG. 11 is a top perspective view of another embodiment of a faceted structure of a mobile device with no electrical charge applied to the faceted structure.

Referring now to FIGS. 11 and 12, yet another embodiment of a mobile device housing 170 includes a base substrate layer 172 having an angled outer face 174 supporting a conductor 176 disposed thereon. A hydrophobic dielectric 178 overlies the conductor 176 and a plurality of polymer cellular walls 180 extend upwardly from the vertices of the angles outer face 174. A non-polar fluid 184 with reflective flakes 186 is located between the upwardly extending cellular walls 180 and a polar fluid 188 is disposed between the hydrophobic dielectric 178 and a top plate 189. Optionally, a transparent conductor 176 may be disposed on an internal portion of the top plate 189. In a non-charged state 194, as shown in FIG. 11, the non-polar fluid 184 and reflective flakes 186 are relatively equally dispersed between the upwardly extending cellular walls 180. When a charge (voltage) is applied to the conductor 176 and the housing 170 is in a charged state 194, the non-polar fluid 184 and reflective flakes 186 are attracted to the conductor 176 and "bunch up" against the upwardly extending cellular walls 180. The hydrophobic dielectric 178 is then exposed, which may have a colored or multi-faceted reflective surface, thereby giving the appearance of a gemstone. When the charge is removed, the reflective flakes 186 and non-polar fluid 184 cover the hydrophobic dielectric 178, thereby reducing or eliminating entirely, the appearance of gemstones on the housing 170. In an alternative embodiment, the flakes may be omitted, and the conductor 176 on the bottom plate may be metallic and reflective. Dye added to the non-polar fluid would then block the light in the absence of applied voltage, and reveal the decorative, reflective surface in the presence of applied voltage.

Yet another embodiment, shown in FIG. 13, illustrates a casing 200 having a transparent external top plate 202 with conductor bus lines 204 spaced intermittently along an internal side of the external transparent top plate 202. A hydrophobic insulator layer 206 is placed over the conductor bus lines 204 (the conductor may be indium tin oxide (ITO)). In addition, a rib or cell wall 208 extends downwardly from the transparent top plate 202 between the conductor bus lines 204. A transparent facet layer 210 is disposed below the hydrophobic insulator layer 206 and has an angled design that reflects light similar to that of a gemstone. In addition, a reflective layer 212 and a back plate 214 are disposed below the transparent facet layer 210. A polar fluid 216 is placed between the hydrophobic insulator layer 206 and the transparent facet layer 210. A non-polar fluid 218 is also placed between the hydrophobic insulator layer 206 and the transparent facet layer 210 and includes a colored dye. The conductor bus lines 204 are connected with a power source 220 such that application of voltage to the conductor bus lines 204 and polar fluid 216 causes the non-polar fluid 218 with the dye to become attracted to the cell wall 208 thereby entering an open position 222. When the charge is removed, over time, the non-polar fluid 218 with dye settles between adjacent cell walls 208 thereby entering a covered position 224.

Referring now to FIG. 14, the illustrated casing 230 includes a transparent top plate 232 having transparent facets 234 extending downwardly therefrom. A substrate 236 is spaced a predetermined distance from the transparent facets 234 and has reflective conductor bus lines 238 that extend over the substrate 236 and a hydrophobic insulator layer 240 extends over the reflective conductor bus lines 238. Ribs 241 extend intermittently along the hydrophobic insulator layer 240. Between the hydrophobic insulator layer 240 and the transparent facets 234 exists a polar fluid 242 as well as a non-polar fluid 244 with dye. The reflective conductor bus lines 238 and polar fluid 242 are connected with a power source 220 and when a predetermined voltage is applied to the reflective conductor bus lines 238, the non-polar fluid 244 with the dye moves toward the ribs 241 thereby entering an open position 246, exposing the reflective conductor bus lines 238 disposed below. Light passes through the transparent top plate 232 and transparent facets 234 and is reflected by the reflective conductor bus lines 238 back toward the transparent top plate 232. The transparent facets 234 reflect the light at various angles giving the impression of a gemstone-like appearance. When the voltage is removed from the reflective conductor bus lines 238, the non-polar fluid 244 enters a covered position 248 and the non-polar fluid 244 with the dye settles between the ribs 241 over the reflective conductor bus lines 238, thereby preventing light from entering through the transparent top plate 232 and transparent facets 234 and being reflected off the reflective conductor bus lines 238. The dye in the non-polar fluid 244 is non-reflective such that when the non-polar fluid 244 is in the covered position 248, it appears as though there are no gemstones in the housing 230.

Referring now to FIGS. 15a-19b, the illustrated embodiment of a mobile device housing 260 depicts a normally reflective faceted surface 262 which can be hidden from view by causing a dyed or pigmented fluid 264 to move onto the reflective surface 262, thereby blocking from view the reflective surface 262. When the reflective surface 262 is blocked by the pigmented fluid 264, light cannot be reflected off of the reflective surface 262. When the housing 260 is in an off or zero power state, the pigmented fluid 264 is hidden below the reflective surface 262.

Figure 21:
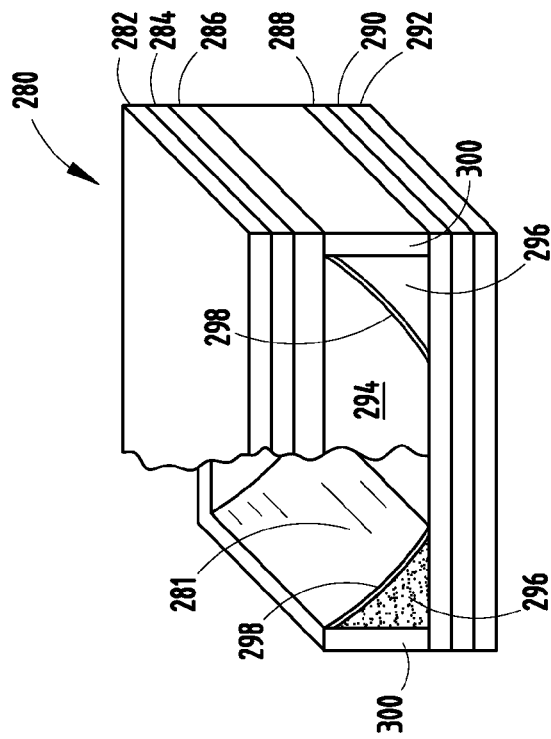
FIG. 21 is the mobile device housing of FIG. 20 with an electrical charge applied to the housing.
Figure 20:
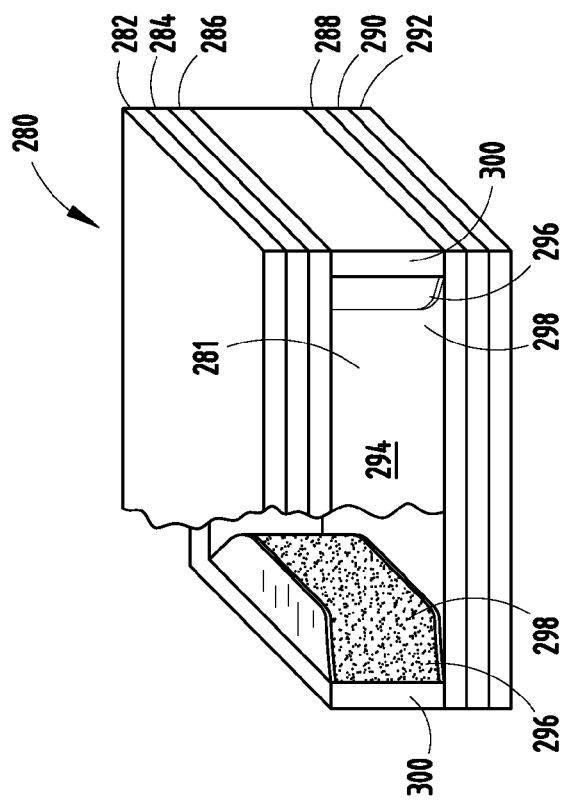
FIG. 20 is a top perspective view of a faceted structure of yet another embodiment of a mobile device housing of the present invention with no electrical charge applied to the housing.

Referring now to FIGS. 20 and 21, another embodiment of a mobile device housing 280 includes a cell 281 having transparent top plate 282 over an upper conductor layer 284. An upper hydrophobic insulator layer 286 is disposed below the upper conductor layer 284 and is spaced a predetermined distance from a lower hydrophobic insulator layer 288 overlying a lower conductor layer 290 which, in turn, overlies a transparent bottom plate 292. Between the upper hydrophobic insulator layer 286 and lower hydrophobic insulator layer 288 exists a non-polar liquid 294 and a polar liquid 296 with a reflective material 298. Each cellular area of the housing 280 is separated by conductive ribs 300. In a zero power state, the polar liquid 296 and reflective material 298 is attracted to the conductive ribs 300 such that the non-polar liquid 294 is forced to an inner area of the cell 281. When a charge is applied to the conductor layers 284, 290, the polar liquid 296 assumes an angled position (FIG. 21) thereby exposing the reflective material 298 at an angle less than 90° relative to the upper hydrophobic insulator layer 286. The reflective material 298 acts as a reflective prism taking on a gemstone-like appearance. It is contemplated that the voltage applied to the upper conductor layer 284 will be less than that to the lower conductor layer 290. In one embodiment, ten volts is added to the upper conductor and fifty volts is added to the lower conductor, while the conductive ribs 300 are grounded.

Referring now to FIGS. 22-27, one embodiment of making a housing 320 for a mobile device includes depositing a conductor 322, such as an ITO, on a substrate 324. Ribs 326 are then secured by screen printing or stamping or possibly by photolithography, although other manners of securing the ribs 326 are contemplated. Next, an insulator layer 328 is positioned over the ribs 328 and conductor 322 and a hydrophobic layer 330 is placed over the insulating layer 328. After the insulator and hydrophobic layers 328, 330 have been added, conductive hydrophilic walls 332 (a conductive polymer, for example) are imprinted to form a plurality of cells 334. Next, water, oil, and reflective material 336 are added to the cells 334 and a top plate 338 with a substrate 340, conductor 342, and insulator 344 and hydrophobic layer 346 are added.

The exemplary embodiments described herein may be fabricated using known lithographic processes as follows. The fabrication of integrated circuits, microelectronic devices, micro electromechanical devices, microfluidic devices, and photonic devices, involves the creation of several layers of materials that interact in some fashion. One or more of these layers may be patterned so various regions of the layer have different electrical or other characteristics, which may be interconnected within the layer or to other layers to create electrical components and circuits. These regions may be created by selectively introducing or removing various materials. The patterns that define such regions are often created by lithographic processes. For example, a layer of photoresist material is applied onto a layer overlying a wafer substrate. A photomask (containing clear and opaque areas) is used to selectively expose this photoresist material by a form of radiation, such as ultraviolet light, electrons, or x-rays. Either the photoresist material exposed to the radiation, or the photoresist material not exposed to the radiation, is removed by the application of a developer. An etch may then be applied to the layer not protected by the remaining resist, and when the resist is removed, the layer overlying the substrate is patterned. Alternatively, an additive process could also be used, e.g., building a structure using the photoresist as a template.

Though the above described lithography processes are preferred, other fabrication processes may comprise any form of lithography, for example, inkjet printing, photolithography, electron beam lithography, and imprint lithography inkjet printing. In the inkjet printing process, the EL particles, which may be pigments or metal flakes, are combined in liquid form with the oil and printed in desired locations on the substrate.

A low cost reflective display technology, electrowetting light valves, may be used to produce over surface stacked black and white shutters, colored shutters, metallic-looking shutters, and sparkling shutters, as described herein. Typical electrowetting devices use a low frequency voltage, including DC, to change the wetting properties of a non-polar fluid (typically an oil) in a polar fluid (i.e., water or air) on a hydrophobic surface, thereby moving one fluid, like a shutter, in and out of view. Depending on the device geometry, either the polar or non-polar fluid, or the interface between can be loaded with pigments, dyes, reflective/metallic particles or flakes, or other materials which modulate light in some way. In certain cases, the "open" condition of the shutter is transparent so that the underlying features are visible when the non-polar fluid is removed from view.

It should be understood that the present invention is applicable to decorative surfaces of portable electronic devices because the power to drive these devices is very low. The power to sparkle the surface for an entire day would consume less than 5% of a typical cell phone battery. However, the present invention can also be used for other decorative surfaces, both portable and non-portable, including appliances (toasters, refrigerators), purses, earrings, and clothing, as long as a power source (battery, solar, electrical socket) is provided.

In sum, one embodiment of the present invention includes a decorative housing for a mobile device. A first faceted cell has first angled electro-optic elements disposed therein. A second faceted cell is adjacent the first cell and has second angled electro-optic elements. A liquid is in fluid communication with each faceted cell and moveable to a first position in response to a first electric field applied to one of the first and second electro-optic elements and moveable to a second position in response to a second dielectric field applied to the other of the first and second electro-optic elements. An electronic modulator is coupled to the first electro-optic element and the second electro-optic element to electronically modulate between the first electric field and the second electric field.

Another embodiment of the present invention includes a decorative housing for a handheld device having a transparent top plate and a hydrophobic dielectric. A first liquid material is disposed between the transparent top plate and the hydrophobic dielectric. A second liquid material is disposed between the transparent top plate and the hydrophobic dielectric. A conductor is connected to an energy source wherein application of energy to the conductor causes the surface area arrangement of the second liquid material to change.

Yet another embodiment of the present invention includes a method for making a decorative housing for a mobile device. A substrate is formed and a conductive layer is deposited on the substrate. Ribs are deposited on the conductive layer and the insulating layer is coated with a hydrophobic layer. Conductive hydrophilic walls are constructed between the ribs to create a plurality of cells. A polar fluid, a non-polar fluid and a reflective material are added to the plurality of cells and a top plate is secured over the plurality of cells.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A decorative housing for an electronic device comprising:
    a first faceted cell having first angled electro-optic elements disposed therein;
    a second faceted cell adjacent the first cell and having second angled electro-optic elements;
    a liquid in fluid communication with each faceted cell and moveable to a first position in response to a first electric field applied to one of the first and second electro-optic elements and moveable to a second position in response to a second electric field applied to the other of the first and second electro-optic elements; and
    an electronic modulator coupled to the first electro-optic element and the second electro-optic element to electronically modulate between the first electric field and the second electric field.

2. The decorative housing of claim 1, wherein the liquid is in the first position in the first faceted cell and in the second position in the second faceted cell.

3. The decorative housing of claim 1, wherein the first and second facets are adjacent to an outer transparent top plate.

4. The decorative housing of claim 1, wherein the electric field is variable to create and hold a variable reflective angle of the first electro-optical element and the second electro-optical element.

5. The decorative housing of claim 1, further comprising:
    a timing circuit coupled to the electronic modulator that regulates the time between the first electric field and the second electric field.

6. The decorative housing of claim 1, wherein the liquid includes a non-reflective dye.

7. The decorative housing of claim 1, wherein the cell includes an external reservoir connected to an internal reservoir by a fluid conduit.

8. The decorative housing of claim 1, further comprising:
a conductive rib wherein the planar extent of the surface area of the liquid is parallel with the conductive rib when no power is supplied to the conductive rib and angled relative to the conductive rib when power is supplied to the conductive rib.

9. A decorative housing for an electronic device, comprising:
a transparent top plate;
a hydrophobic dielectric;
a first liquid material disposed between the transparent top plate and the hydrophobic dielectric;
a second liquid material disposed between the transparent top plate and the hydrophobic dielectric, the second fluid includes reflective flakes;
a bottom plate, wherein one of the transparent top plate and the bottom plate includes faceted structures; and
a conductor connected to an energy source wherein application of energy to the conductor causes the surface area arrangement of the second liquid material to change.

10. The decorative housing of claim 9, wherein the hydrophobic dielectric and conductor are angled relative to the transparent top plate.

11. The decorative housing of claim 9, further comprising: a plurality of ribs that define cells.

12. The decorative housing of claim 11, wherein the ribs are of varying heights.

13. The decorative housing of claim 9, wherein:
the bottom plate is transparent and wherein application of energy to the conductor provides a transparent optical path between the top plate and the bottom plate.

14. The decorative housing of claim 9, wherein the second fluid is angled relative to the transparent top plate between short and tall ribs which gives the appearance of a reflective faceted gemstone.

15. The decorative housing of claim 9, further comprising:
a non-reflective substrate wherein application of power to the transparent conductor causes the second liquid and reflective flakes to gather around the short and tall ribs.

16. A method for making a decorative housing for an electronic device, the method comprising:
forming a substrate;
depositing a conductive layer on the substrate;
depositing ribs on the conductive layer;
coating the conductive layer with an insulating layer;
coating the insulating layer with a hydrophobic layer;
constructing conductive hydrophilic walls between the ribs to create a plurality of cells;
adding a polar fluid, a non-polar fluid and a reflective material to the plurality of cells;
providing a faceted surface among the plurality of cells; and
securing a top plate over the plurality of cells.

17. The method of claim 16, further comprising:
revealing underlying features of the electronic device upon application of an electric charge to the conductive layer.

18. The method of claim 17, wherein the step of revealing underlying features further comprises:
displaying a change of appearance in the decorative housing resulting from an activation signal sent by the electronic device.

19. The method of claim 17, wherein the step of revealing underlying features further comprises:
displaying a change in appearance of the decorative housing resulting from input provided by a user.

* * * * *